United States Patent [19]

Quaglia

[11] Patent Number: 4,876,793
[45] Date of Patent: Oct. 31, 1989

[54] JAMB SAW

[76] Inventor: James A. Quaglia, 88C Friendship Rd., Howell, N.J. 07731

[21] Appl. No.: 212,248

[22] Filed: Jun. 27, 1988

[51] Int. Cl.$^4$ ............................................. B27B 11/02
[52] U.S. Cl. ...................................... 30/122; 30/293; 30/373; 30/501
[58] Field of Search ................. 30/122, 373, 276, 293, 30/501, 508, 503.5, 507, 392, 394; 83/746, 751

[56] References Cited

U.S. PATENT DOCUMENTS

| | | | |
|---|---|---|---|
| 2,178,476 | 10/1939 | Grahek | 83/758 |
| 2,610,658 | 9/1952 | Koeling | 30/276 |
| 3,111,969 | 11/1963 | Bivens | 30/373 |
| 3,412,767 | 11/1968 | Green, Jr. | 30/392 |
| 4,114,270 | 9/1978 | Jansen-Herfeld et al. | 83/746 |
| 4,235,017 | 11/1980 | Yavis | 30/392 |
| 4,505,037 | 3/1985 | Farkas | 30/122 |

Primary Examiner—Frank T. Yost
Assistant Examiner—Y. Lin
Attorney, Agent, or Firm—Clifford G. Frayne

[57] ABSTRACT

A portable power driven horizontally reciprocating saw for cutting door jambs or door casings having a saw blade secured to an assembly plate which is slideably receivable in a second assembly plate mounted in a horizontal plane for the horizontal reciprocation of the saw blade.

9 Claims, 3 Drawing Sheets

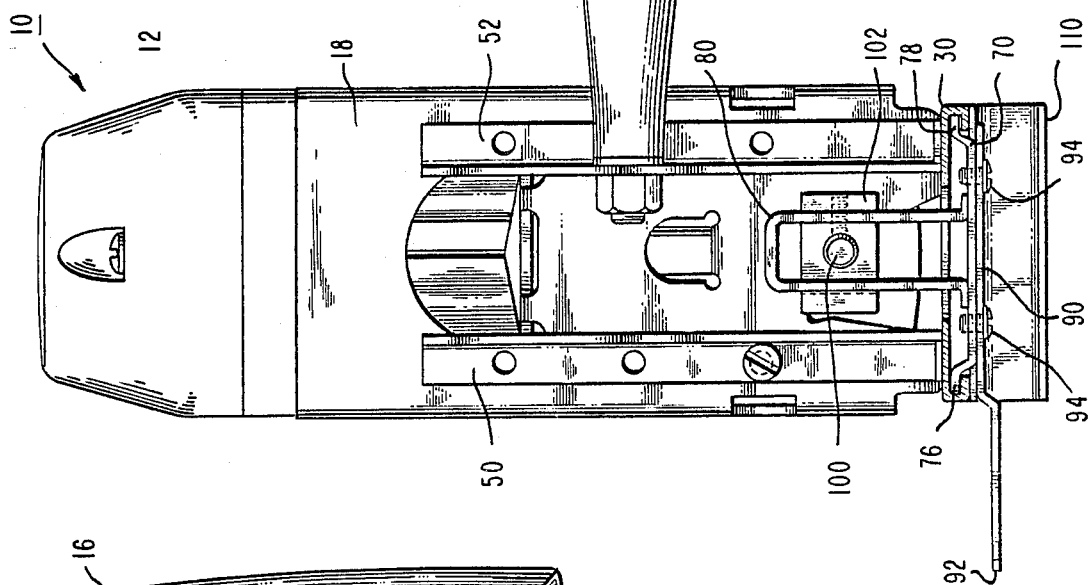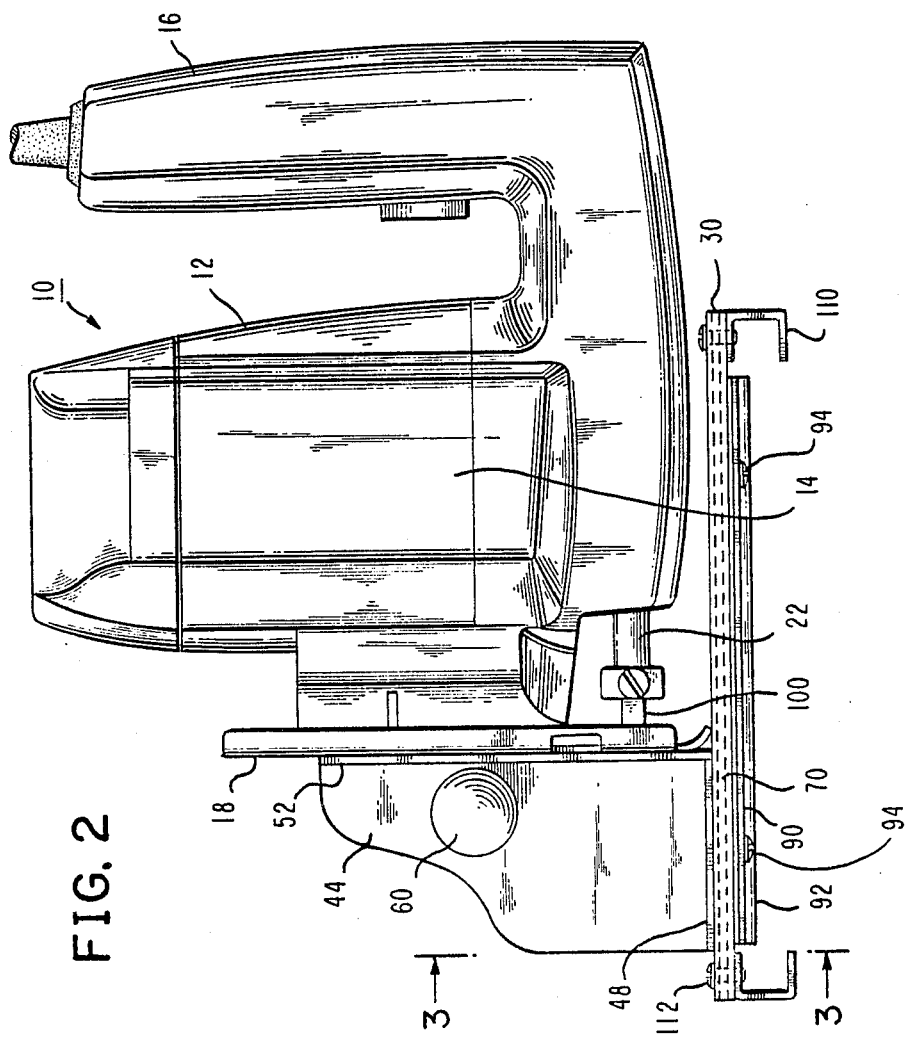

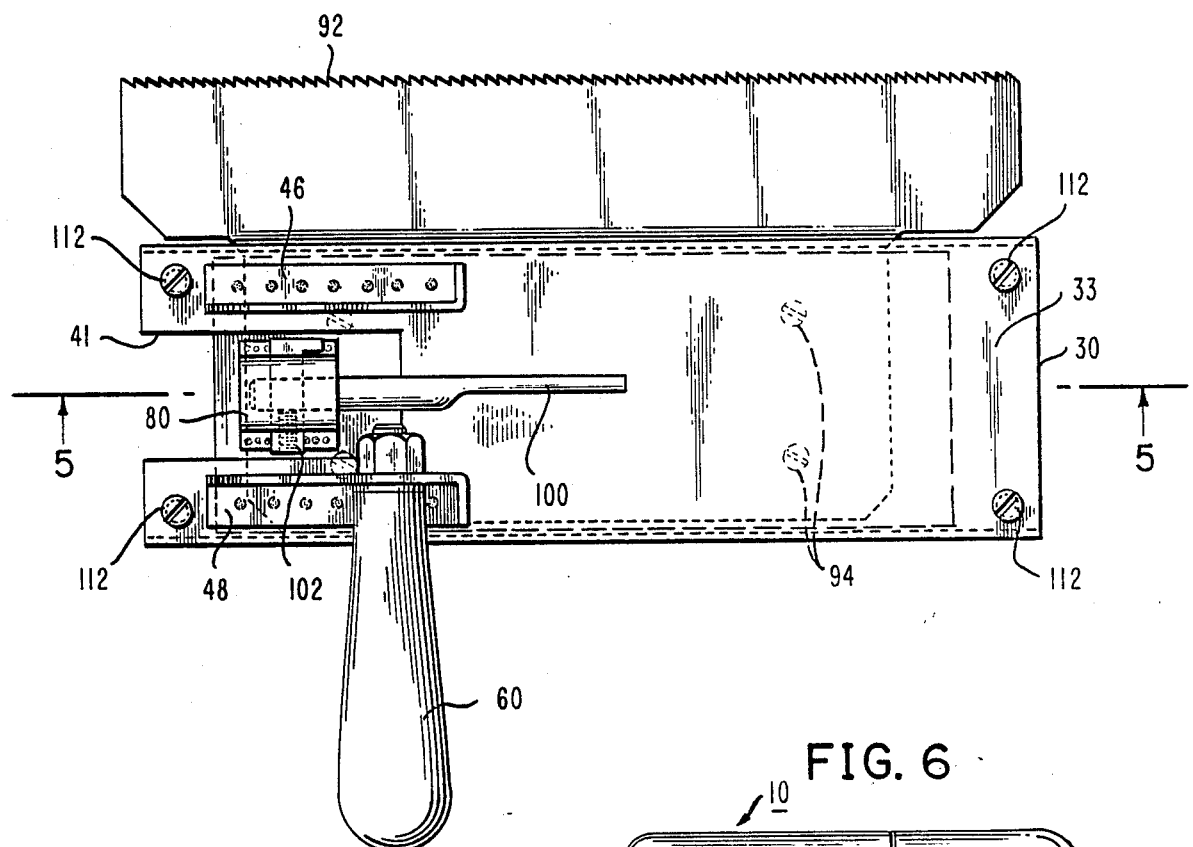
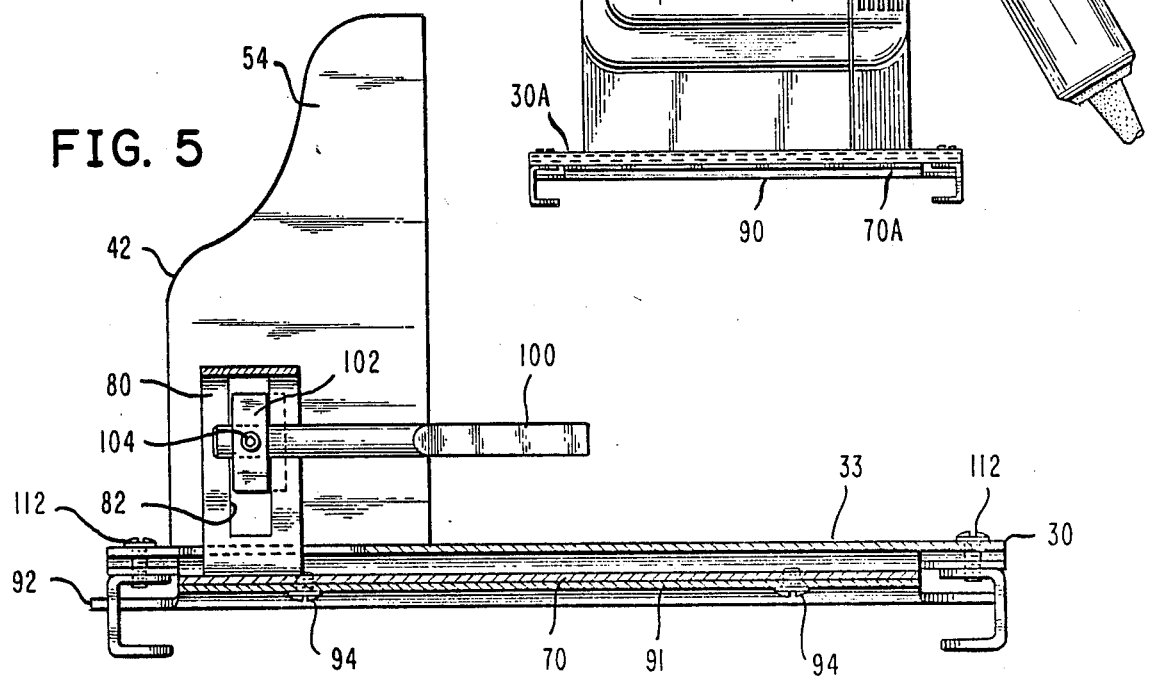

JAMB SAW

FIELD OF INVENTIONB

The invention relates to saws and, in particular, to a saw for undercutting door jambs and casings. The saw utilizes the reciprocating action of a standard jig saw or saber saw hereafter collectively referred to as jig saws and can be manufactured for use as an attachment to a standard jig saw or as a complete motorized unit.

BACKGROUND OF THE INVENTION

In the installation of floor materials in homes and buildings, it becomes necessary to remove a lower portion of the door jamb casing. This allows the contractor to aesthetically and efficiently install floor materials under the door jambs and casings.

The applicant's invention relates to an attachment. This device modifies a standard jig saw to permit the cutting of door jambs and casings. The saw blade uses a horizontal reciprocating action. This provides the operator with better control and accuracy for cutting under the door jamb and casing.

Applicant's invention may be utilized as an attachment to a standard jig saw or it could also be manufactured as a complete motorized unit. Applicant's invention provides for a safer, more controlled sawing action than the rotary saws disclosed in U.S. Pat. Nos. 2,610,658 and 3,111,969.

OBJECTS OF THE INVENTION

An object of the present invention is to provide a novel saw and saw blade which attaches to a standard jig saw and permits reciprocating sawing action in a horizontal plane.

A further object of the present invention is to provide for a novel saw and saw blade utilizing the reciprocating action of a standard jig saw for cutting door jambs and casings.

A still further object of the present invention is to provide for a novel saw and saw blade which has a reciprocating action in a horizontal plane and is produced as a complete motorized unit.

SUMMARY OF THE INVENTION

These and other objects of the invention are achieved by the jamb saw attachment and blade which is comprised of two interlocking assemblies. The upper assembly has fixed to it, mounting brackets to receive a standard jig saw turned so that the reciprocating action of the jig saw is in a horizontal plane. The lower assembly which slidably interlocks with the upper assembly has affixed to it a drive post with drive block and drive pin in communication with the standard jig saw, the lower assembly having a saw blade attached to the bottom of the lower assembly with mounting screws, the height of the cut above the base floor being determined by shoe plates attached to the upper assembly which allow for the precision cutting of the jambs and casings at a desired height.

BRIEF DESCRIPTION OF THE DRAWINGS

These and other objects of the present invention will be manifest in considering the accompanying drawings wherein:

FIG. 2 is a side elevational view of the jig saw and jamb saw attachment.

FIG. 3 is a front elevational view of the jig saw and jamb saw attachment along axis 3—3 of FIG. 2.

FIG. 4 is a top planer view of the jamb saw attachment.

FIG. 5 is a side elevational view of the jamb saw attachment along axis 5—5 of FIG. 4.

FIG. 6 is a side elevational view of a second embodiment of a modified jig saw with built-in jamb saw in accordance with the present invention.

DETAILED DESCRIPTION OF THE DRAWINGS

Figure 1:
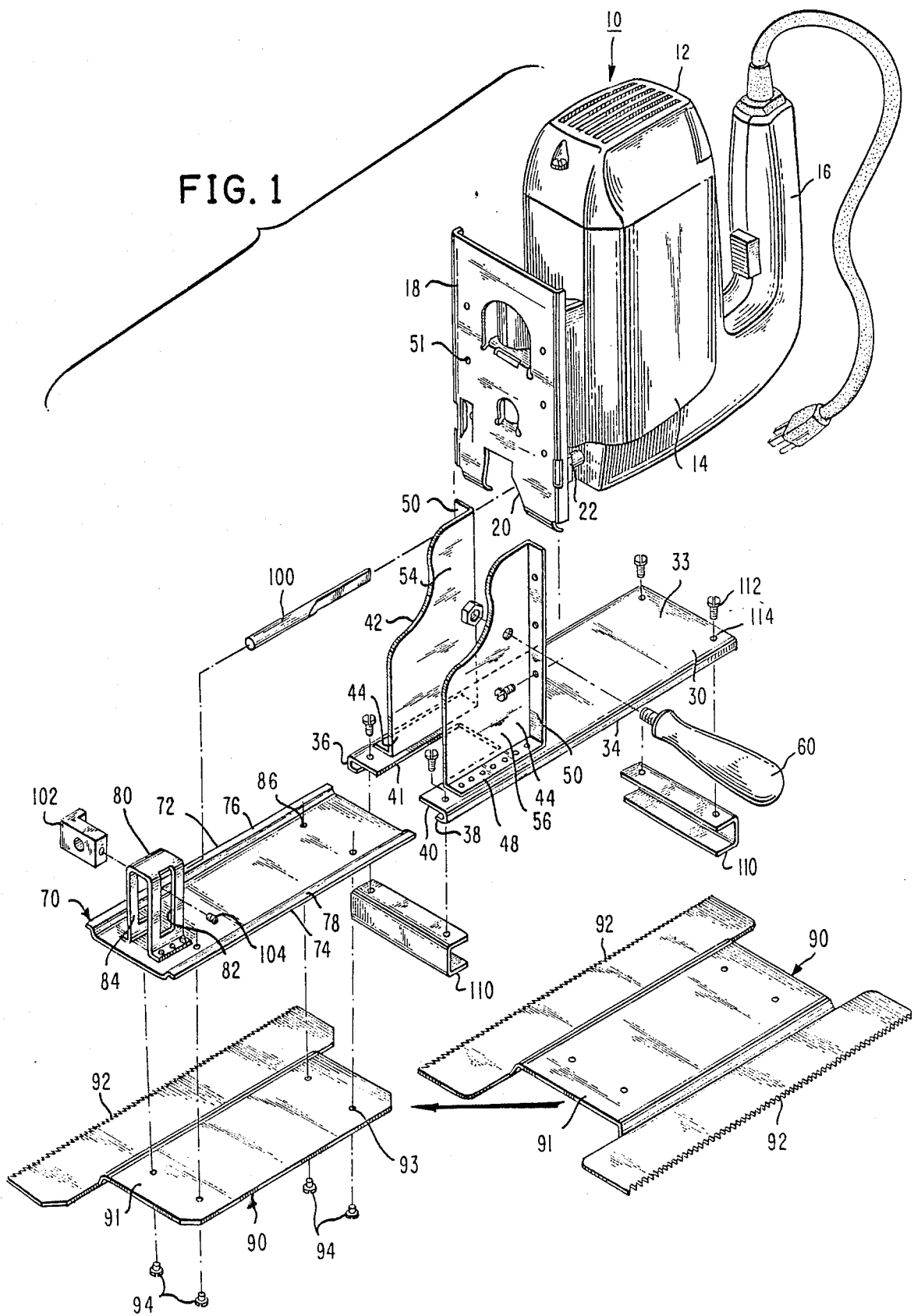
FIG. 1 is an exploded perspective view of a jig saw with the jamb saw attachment.

Referring to FIG. 1, there is shown an exploded perspective view of a standard jig saw with the jamb saw attachment which is the subject of the present invention. The standard jig saw 10 comprises a casing 12 which encompasses a power means 14. Casing 12 is normally of one piece metal or plastic construction and is formed so as to incorporate a handle 16. Jig saw 10 normally has a skid plate 18 secured to its base, skid plate 18 designed to contact the surface which is to be subjected to the cutting action of the jig saw. Skid plate 18 has a substantially U-shaped opening 20 in one lateral edge to accommodate a standard saw blade which would be secured to the reciprocating means 22 which normally comprises a longitudinal chamber for receipt of one end of the jig saw blade and a set screw means for securing the blade.

The electrical connection to an electrical unit is normally contained in handle 16 of a standard jig saw.

As can be seen in FIG. 1 and in FIG. 2, which is a side elevational view of the jig saw and jamb saw attachment, for applicant's purpose, the jig saw 10 is rotated ninety degrees so that skid plate 18 is in a vertical configuration and the reciprocating means 22 which would operate on the vertical axis in normal operation is now positioned to operate on a horizontal axis.

The jamb saw attachment to be secured to this configuration of jig saw 10 comprises an upper assembly plate 30 which is generally rectangular in configuration, the longitudinal edges 32 and 34 being rolled under to form longitudinal flanges 36 and 38 which define slotted channel 40 for slidably receiving lower assembly plate 70 as described hereafter.

Upper assembly plate 30 has a generally U-shaped or rectangular shaped channel 41 extending inwardly from one transverse end along its longitudinal axis.

Mounted to upper surface 33 of upper assembly plate 30 are a pair of mounting brackets 42 and 44 which are secured to upper surface 33 of upper assembly plate 30 on each side of U-shaped channel 41. Mounting brackets 42 and 44 comprise planer horizontal legs 46 and 48 for attachment to upper surface 33 of upper assembly plate 30 and vertical planer legs 50 and 52 positioned at right angles to horizontal legs 46 and 48 with a planer support wall 54 and 56 respectively secured to planer horizontal legs 46 and 48 and planer vertical legs 50 and 52. Planer vertical legs 50 and 52 contain a plurality of apertures therethrough for alignment with apertures 51 in skid plate 18 of jig saw 10 in order to secure jig saw 10 to mounting brackets 42 and 44. A handle 60 can be removably secured to either planer support wall 54 or 56 for operation of the jamb saw as will be discussed further hereafter.

FIG. 2 shows a side elevational view of the jig saw and jamb saw attachment and shows in further detail the manner in which skid plate 18 of jig saw 10 is secured to mounting brackets 42 and 44. FIG. 3 which is a front elevational view of the jig saw and jamb saw attachment shows a further view of such attachment together with handle 60.

Slotted channel 40 of upper assembly plate 30 is designed to receive lower assembly plate 70. Lower assembly plate 70 is rectangular in shape having its longitudinal edges 72 and 74 rolled upwardly to define longitudinal flanges 76 and 78. Longitudinal flanges 76 and 78 are designed to be slidably received into slotted channel 40. The longitudinal axis of lower assembly plate 70 is slightly shorter than the longitudinal axis of upper assembly plate 30 to permit lower assembly plate 70 to be completely received within slotted channel 40. Positioned proximate to one transverse end of lower assembly plate 70 is a drive post 80. Drive post 80 is a generally inverted U-shaped post having transverse coincidental openings 82 and 84 positioned on the vertical legs.

As described hereafter, U-shaped channel 41 in upper assembly plate 30 accommodates drive post 80 when lower assembly plate 70 is slidably positioned in slotted channel 40.

Lower assembly plate 70 contains a plurality of apertures 86 positioned to receive a saw plate 90.

Saw plate 90 is of one-piece construction and comprises a securing plate 91 having a series of apertures 93 therethrough for alignment with threaded apertures 86 in lower assembly plate 70. Saw plate 90 is one-piece construction with saw blade 92 being stepped slightly lower than fastening plate 91. Fastening means 94 comprise either bolts or screws which may be threaded directly into apertures 86 on lower assembly plate 70 or secured by a pem nuts. In this configuration, when saw plate 90 is secured to lower assembly plate 70 and lower assembly plate 70 is slidably positioned in slotted channel 40 of upper assembly plate 30, saw blade 92 extends outwardly along one longitudinal edge of upper assembly plate 30. This can best be seen with reference to FIG. 3 which is a front elevational view of the jig saw and jamb saw attachment. In a second embodiment shown in FIG. 1, saw plate 90a can have two saw blades 92a, each extending along longitudinal edge of fastening plate 91 and stepped slightly lower than fastening plate 91. As will be described hereafter, this embodiment provides a further convenience for the operator in manipulating the saw.

Once saw plate 90 is secured to lower assembly plate 70, lower assembly plate 70 would be slidably inserted into slotted channel 40. Drive pin 100 would be secured to reciprocating means 22 on jig saw 10 and secured to drive post 80 by means of a drive block 102 which would be slidably inserted through transverse apertures 82 and be secured to drive pin 100 by means of a frictionally engageable set screw 104. Drive block 102 in its preferred embodiment is L-shaped in cross sectional area to resist twisting in transverse aperture 82. It will be recognized that there are alternative means for the design of drive pin 100 and drive block 102 including a threaded drive pin secured to drive block 102 by means of a threaded aperture and that drive block 102 could be of another configuration as long as it can be contained in transverse aperture 82.

Shoe plates 110 would then be secured to upper assembly plate 30 by means of securing means 112 and coincidental apertures 114 and 114A in shoe plates 110 and upper assembly plate 30. Shoe plates 110 are designed to provide a desired height above the floor surface for the reciprocating action of saw blade 92.

Referring to FIG. 4, there is shown a top planer view of the jamb saw attachment without the jig saw 10 secured thereto. Similarly, FIG. 5 is a side elevational view of the jamb saw along axis 5—5 of FIG. 4 without the jig saw 10 secured thereto. In these figures, it can be seen that lower assembly plate 70 with saw plate 90 secured thereto is slidably movable within slotted channel 40 of upper assembly plate 30. The reciprocating action of reciprocating means 22 on a standard jig saw is normally in the range of one-eighth to three-quarters of an inch. The dimensions of fastening plate 91 of saw plate 90 is such that when this reciprocating action is imparted to saw plate 90 by means of drive pin 100, drive block 102 and drive post 80, saw blade 92 will operate in a reciprocating motion on a horizontal plane, but saw plate 90 secured to lower assembly plate 70 will not move in the horizontal plane such that it will contact shoe plates 110.

Referring specifically to FIG. 5, it can be seen that the transverse aperture 82 in drive post 80 and the longitudinal aperture defined by the configuration of drive post 80 permits drive block 102 with drive pin 100 secured thereto the opportunity to move in a vertical plane. This permits the jamb saw attachment to be adapted to jig saws 10 that may have reciprocating means 22 of varying heights or positions.

It can further be seen by reference to FIG. 5, that the operator can vary the height of saw blade 92 above the floor by varying the height of shoe plates 110. In the alternative, the operator could merely place an additional planer support on the floor to raise the height of saw blade 92.

The assembly of the jig saw 10 and jamb saw attachment requires the operator to secure skid plate 18 to vertical support legs 50 and 52 of mounting brackets 42 and 44. Saw plate 90 would then be secured to lower assembly plate 70 by means of securing means 94. Lower assembly plate 70 would then be slidably received within slotted channel 40 of upper assembly plate 40 and shoe plates 110 would be secured to upper assembly plate 30 by means of fastening means 112. The operator would then secure drive pin 100 to reciprocating means 22 of jig saw 10 and secure the opposite end of drive pin 100 to a drive block 102 positioned within drive post 80. The operator would then secure a source of electrical energy for jig saw 10 and the reciprocating means 22 now operating in a horizontal plane would transfer the reciprocating action by means of drive pin 100 and drive block 102 to drive post 80 which, in turn, being fastened to saw plate 90, would transfer the reciprocating action to saw blade 92 thus providing a saw blade operating in a horizontal plane.

The doubled edged saw plate 90a as shown in FIG. 1 as a second embodiment, is one of convenience for the operator which would permit him to-cut opposite sides of a door jamb from one position as opposed to having to reposition himself when using a saw plate 90a having only one saw blade.

It will be recognized by those skilled in the art that applicant has designed an attachment which is adaptable to a variety of standard jig saws which enables the jig saw to be rotated ninety degrees such that the reciprocating action of the jig saw now operates in a horizontal plane, and through applicant's attachment, transfers this horizontal reciprocating motion to a saw blade operating in a horizontal plane. It would also be possible to reconfigure the internal mechanism of a jig saw such that its reciprocating action is designed to operate in a horizontal plane. In such a configuration, as shown in the second embodiment in FIG. 6, an upper assembly plate and lower assembly plate with saw blade could be incorporated directly to the jig saw eliminating the need for the mounting brackets and drive pin, drive block, and drive post as shown in the applicant's jamb saw attachment. Nevertheless, this would still be in keeping with the spirit and intention of applicant's invention of rearranging the jig saw to provide a reciprocating action in a horizontal plane. Such is the case as disclosed in FIG. 6 where the jig saw 10 no longer requires mounting brackets, but merely a built-in upper assembly plate and lower assembly plate 30A and 70A respectively with the saw plate 90 secured directly thereto. This embodiment would provide a self-contained jamb saw designed for the specific purpose of cutting jambs and casings as opposed to applicant's first embodiment which consists of an attachment which permits an individual to adapt his standard jig saw to provide such cutting action.

I claim:

1. A portable, power-driven, horizontally reciprocating saw utilizing a standard jig saw having a reciprocating means, a skid plate and a motor means, said jig saw positioned such that said reciprocating means is positioned to reciprocate in a horizontal plane, comprising:
   an upper assembly plate having longitudinal edges and transverse ends, said upper assembly plate having two upstanding mounting brackets perpendicularly secured to said upper assembly plate, said upper assembly plate having a U-shaped slot positioned between said brackets, said upper assembly plate having said longitudinal edges thereof curved under to define a channel between said transverse ends;
   a lower assembly plate slidably receivable in said channel of said upper assembly plate, said lower assembly plate having a drive post secured thereto, said drive post slidably receivable in said U-shaped slot of said upper assembly plate when said lower assembly plate is slidably received in said channel of said upper assembly plate;
   a saw plate having a mounting portion and at least one longitudinally extending saw blade portion;
   a means for mounting said saw plate to said lower assembly plate;
   a plurality of shoe plates secured to said transverse ends of said upper assembly plate to adjust the height of said saw blades;
   a drive pin having a first end secured to said reciprocating means of said jig saw and having a second end secured to a drive block removably secured to said drive post on said lower assembly plate for transmitting said horizontal reciprocating action of said jig saw to said lower assembly plate and to said saw blade.

2. An apparatus in accordance with claim 1 wherein said jig saw is mounted to said upper assembly plate by fastening means utilizing coincidental apertures in said mounting brackets and said skid plate of said jig saw.

3. An apparatus in accordance with claim 1 wherein the longitudinal edges of said lower assembly plate are slidably received in the channel defined by said longitudinal edges of said upper assembly plate.

4. An apparatus in accordance with claim 1 wherein said drive post has intersecting longitudinal and transverse apertures to accommodate said drive block secured to said second end of said drive pin, said longitudinal and transverse apertures being disposed to provide for vertical movement of said drive block to accommodate jig saws of varying sizes having reciprocating means of various heights.

5. An apparatus in accordance with claim 1 wherein said drive block is retained within said drive post by means of its cross sectional L-shaped configuration.

6. An apparatus in accordance with claim 1 wherein said mounting means for said saw plate and said lower assembly plate comprises coincidental apertures in said saw plate mounting portion and said lower assembly plate for receipt of a fastening means.

7. An apparatus in accordance with claim 1 wherein said saw plate mounting portion and said saw blade portion are offset such that said saw blade portion is slightly lower than said mounting portion.

8. An apparatus in accordance with claim 1 wherein said saw plate has two longitudinally extending saw blade portions disposed along opposite longitudinal edges of said saw plate.

9. A portable, hand-held, power-driven, horizontally reciprocating saw for cutting door casings and door jambs comprising:
   a housing, said housing containing a motor means in communication with an electrical power source, said housing having a handle grip secured thereto;
   a reciprocating means in communication with said motor means, said reciprocating means and said motor means positioned in said housing such that said reciprocating means reciprocates in a horizontal plane proximate to the lower portion of said housing;
   a fixed assembly plate having longitudinal edges and transverse edges, said assembly plate longitudinal edges being curved to define a channel between said transverse edges; said fixed assembly plate horizontally mounted to said lower portion of said housing; said assembly plate having adjustable supports in communication with a floor proximate to said door casing or door jambs for adjusting the height of said assembly plate above said floor;
   a horizontal saw plate having a mounting means and at least one longitudinal extending blade portion, said mounting portion of said saw plate slidably receivable within said channel between said transverse edges of said assembly plate, said mounting means secured to said reciprocating means by a drive pin for said horizontal reciprocation within said channel of said assembly plate of said saw plate and said saw blade under the influence of electrical power supplied by said motor means; said saw plate reciprocating in a horizontal plane, said saw blade reciprocating parallel to said longitudinal edges of said assembly plate.

* * * * *